(12) United States Patent
Mukai

(10) Patent No.: US 9,939,713 B2
(45) Date of Patent: *Apr. 10, 2018

(54) IMAGING DEVICE AND PLATE SPRING

(71) Applicant: Sony Corporation, Tokyo (JP)

(72) Inventor: Takanori Mukai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,316

(22) Filed: Oct. 19, 2016

(65) Prior Publication Data

US 2017/0038663 A1   Feb. 9, 2017

Related U.S. Application Data

(63) Continuation of application No. 13/917,726, filed on Jun. 14, 2013, now Pat. No. 9,497,362, which is a continuation of application No. 13/270,295, filed on Oct. 11, 2011, now Pat. No. 8,469,612.

(30) Foreign Application Priority Data

Oct. 27, 2010   (JP) .................................. 2010-241255

(51) Int. Cl.
  *H04N 5/225*   (2006.01)
  *G03B 17/56*   (2006.01)
  *G03B 37/00*   (2006.01)
  *H04N 7/18*    (2006.01)

(52) U.S. Cl.
  CPC .......... *G03B 17/561* (2013.01); *G03B 37/00* (2013.01); *H04N 5/2254* (2013.01); *H04N 7/183* (2013.01)

(58) Field of Classification Search
  None
  See application file for complete search history.

(56) References Cited

U.S. PATENT DOCUMENTS 8,469,612 B2   6/2013   Mukai
2003/0103161 A1   6/2003   Tatewaki et al.
2004/0263681 A1   12/2004   Teramoto et al.
(Continued)

FOREIGN PATENT DOCUMENTS

CN   1906533   1/2007
JP   11-161991   6/1999
(Continued)

OTHER PUBLICATIONS

Office Action issued in corresponding Chinese Application No. 2011103304823 dated May 29, 2015 and the English Translation.
(Continued)

*Primary Examiner* — Kevin McInnish
(74) *Attorney, Agent, or Firm* — Haug Partners LLP; William S. Frommer

(57) ABSTRACT

Disclosed herein is an imaging device including: a lens case on which a lens is installed; a columnar member having a central axis coincidental with a rotational axis of the lens case and formed on a lateral surface of the lens case, the rotational axis extending in a tilt direction being an in-plane direction perpendicular to a horizontal direction; a base supporting the lens case so as to be turnable in the tilt direction; and a plate spring secured to the base and pressing a circumferential surface of the columnar member toward the base by elastic force.

10 Claims, 11 Drawing Sheets

(56) References Cited

U.S. PATENT DOCUMENTS

2008/0231699 A1* 9/2008 Konishi .............. H04N 5/2251
                                              348/143
2011/0249352 A1* 10/2011 Ku ..................... F16F 1/027
                                              359/824

FOREIGN PATENT DOCUMENTS

| JP | 2003-174571 | 6/2003 |
| JP | 2005-221637 | 8/2005 |
| JP | 2005-310318 | 11/2005 |
| JP | 2008-33151 | 2/2008 |

OTHER PUBLICATIONS

Office Action issued in corresponding Chinese Application No. 2011103304823 dated Jan. 20, 2016 and its English Translation.

* cited by examiner

IMAGING DEVICE AND PLATE SPRING

This is a continuation of application Ser. No. 13/917,726, filed Jun. 14, 2013, which is a continuation of application Ser. No. 13/270,295, filed Oct. 11, 2011, now U.S. Pat. No. 8,469,612, issued Jun 25, 2013, which claims priority under 35 USC 119 to Japanese Application No. 2010-241255, filed in Japan Oct. 27, 2010, the entirety of which is incorporated herein by reference.

BACKGROUND

The present technology relates to an imaging device and a plate spring.

Imaging devices such as security cameras and the like are used to take a picture of surrounding environment but have a fixed installation position. Therefore, a lens of the imaging device is desirably moved horizontally and vertically depending on the relationship between a range capable of being shot through the lens installed in the security camera and a site to be shot by a user by use of the security camera. Incidentally, the horizontal movement of a lens is referred to as the movement in a pan direction and the vertical movement of the lens is referred to as the movement in a tilt direction.

A security camera is generally composed of a lens block or a member including a lens and a support member for supporting the lens block and securing a main body to a ceiling or the like in a room. In this case, the lens block can be moved in pan and tilt directions with respect to the support member.

SUMMARY

A lens block has heretofore been positioned in pan and tilt directions by e.g. a ball joint, a universal joint or the like. However, such a mechanism has a complicated structure and needs a large space for installation of component parts. In addition, such a structure needs a large number of screws for the installation of the component parts. Consequently, it is hard to achieve downsizing and cost reduction in the manufacture of the imaging device.

It is desirable to provide a noble and improved imaging device and plate spring that can achieve the downsizing of the whole, and change the direction of a lens and secure the position of the lens with a simple configuration.

According to an embodiment of the present disclosure, there is provided an imaging device including: a lens case on which a lens is installed; a columnar member having a central axis coincidental with a rotational axis of the lens case and formed on a lateral surface of the lens case, the rotational axis extending in a tilt direction being an in-plane direction perpendicular to a horizontal direction; a base supporting the lens case so as to be turnable in the tilt direction; and a plate spring secured to the base and pressing a circumferential surface of the columnar member toward the base by elastic force.

The plate spring may have a first bent portion pressing the circumferential surface of a columnar member toward the base.

The plate spring may further have a plate-like insertion portion, and the base may have a first opening adapted to receive the insertion portion inserted thereinto to secure the plate spring.

The imaging device may further include a cover allowing the lens to be exposed and covering the lens case, the columnar member, the base and the plate spring; and the plate spring may secure the cover to the base by elastic force.

The cover may support the lens case turnably in the tilt direction.

The plate spring may have a second bent portion securing the cover to the base.

The cover may have a second opening adapted to receive the plate spring inserted thereinto and a guide portion guiding the plate spring to the second opening.

According to another embodiment of the present disclosure, there is provided a plate spring including: a first spring portion pressing a circumferential surface of a columnar member toward a base supporting the lens case, the columnar member being formed on a lateral surface of a lens case on which a lens is installed; and a second spring portion securing a cover to the base by elastic force, the cover covering the lens case, the columnar member and the base while allowing the lens to be exposed.

The plate spring may further include a plate-like insertion portion inserted into a first opening formed in the base.

The present disclosure described above can downsize the whole of the device and change and fix the direction and position of the lens with the simple configuration.

DETAILED DESCRIPTION OF THE PREFERRED EMBODIMENTS

Figure 1:
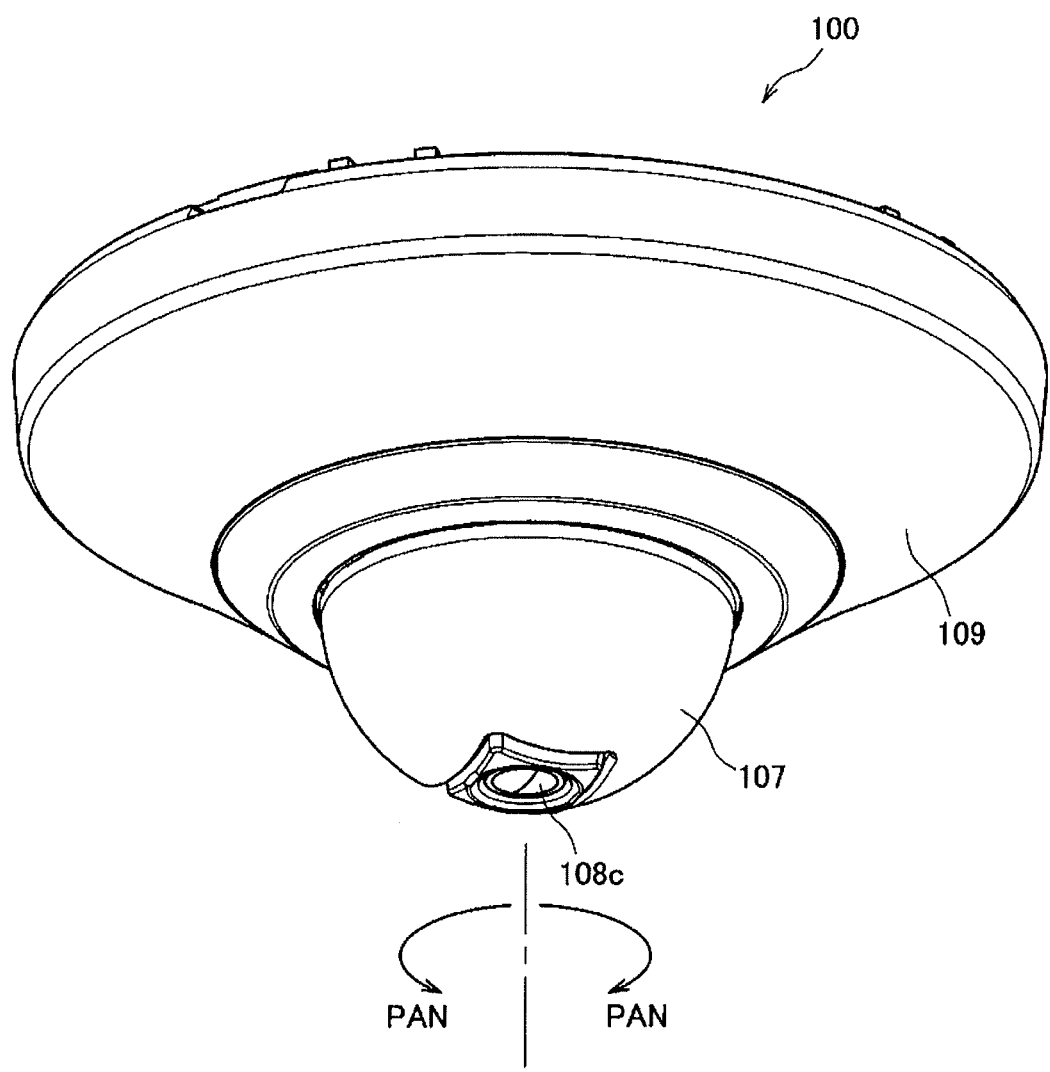
FIG. 1 is a perspective view of a security camera according to an embodiment of the present disclosure.

Preferred embodiments of the present disclosure will hereinafter be described in detail with reference to the accompanying drawings. Incidentally, in the present specification and drawings, constituent elements having substantially identical functional configurations are denoted with like reference numerals and their duplicate explanations are omitted.

Descriptions are given in the following order.
1. A configuration in an embodiment
2. An assembly method in the embodiment
3. An adjustment method in the embodiment <1. Configuration in the Embodiment>

A description is first given of a security camera 100 according to an embodiment of the present disclosure.

Figure 2:
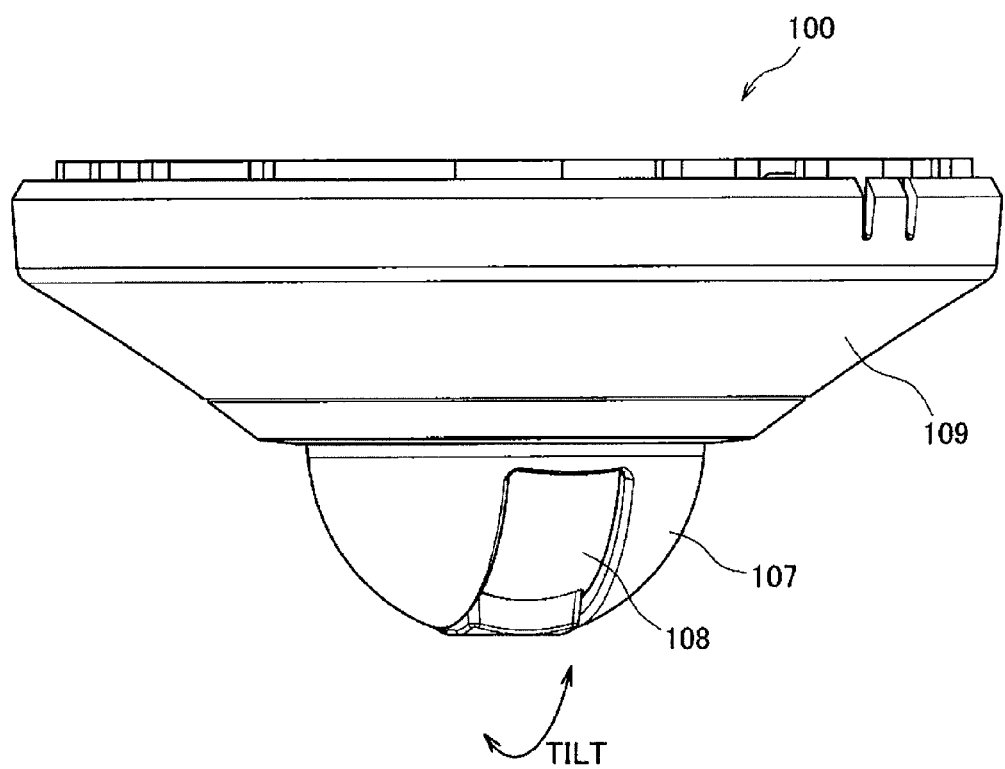
FIG. 2 is a lateral view of the security camera according to the embodiment.
Figure 3:
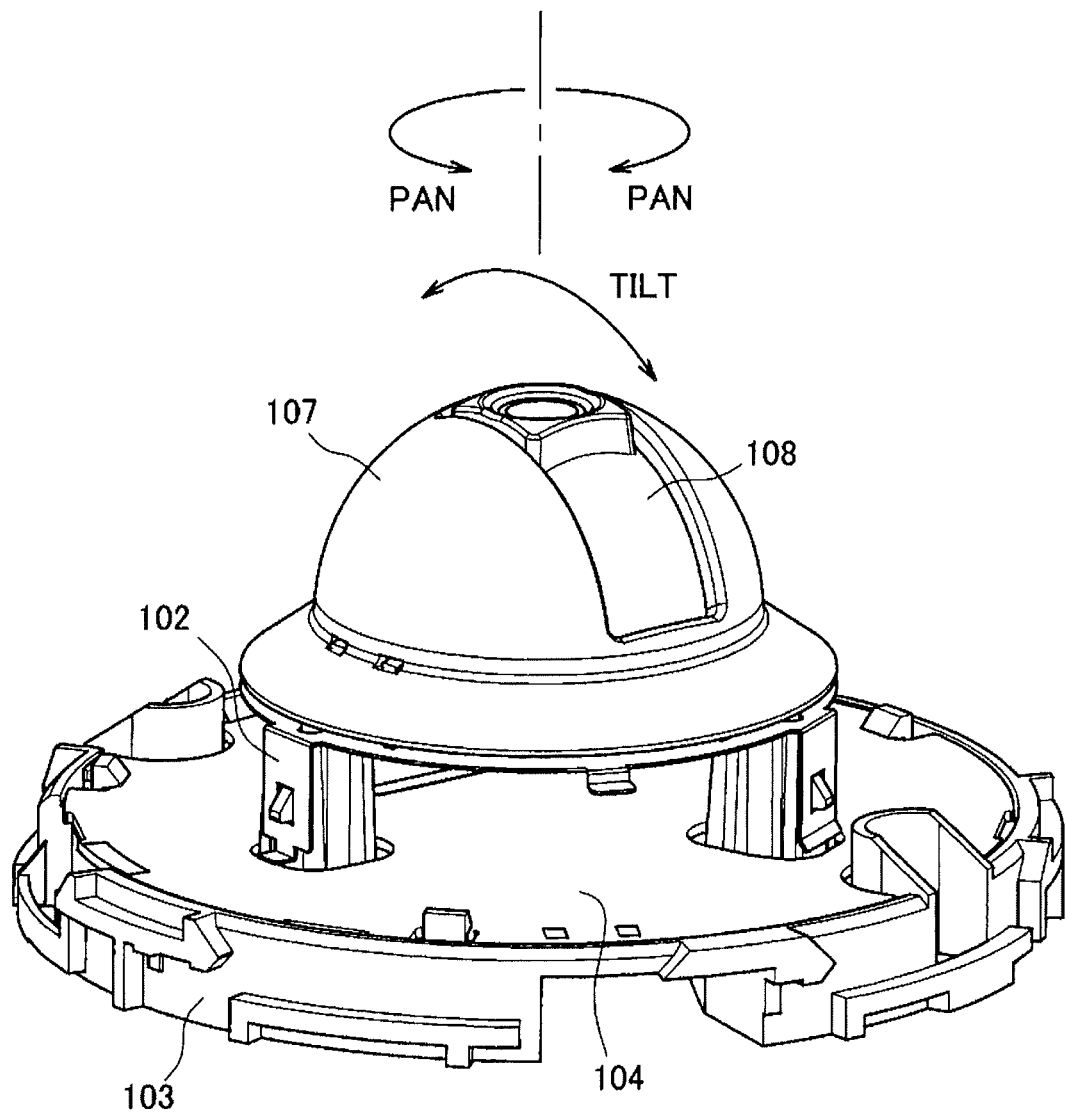
FIG. 3 is a perspective view of the security camera according to the embodiment with an exterior cover removed.

The security camera 100 is secured to a horizontal plane such as e.g. a ceiling of a room or the like. The security camera 100 takes photos of surrounding environment as moving images or still images. As illustrated in FIGS. 1 and 2, a lens 108c of the security camera 100 can manually be shifted in horizontal and vertical directions. Incidentally, the horizontal movement of the lens 108c is referred to as the movement in a pan direction and the vertical movement of the lens 108c is referred to as the movement in a tilt direction. Adjusting the position of the lens 108c installed in the security camera 100 can take a photo of a site to be shot by a user with the security camera 100 regardless of a range capable of being shot through the lens 108c.

The security camera 100 includes a lens block 101 covered by an exterior cover 107; an lower case 103 covered by the exterior cover 109; and a circuit board 104, on which electronic parts such as circuits required to operate the security camera 100 are mounted.

Figure 7:
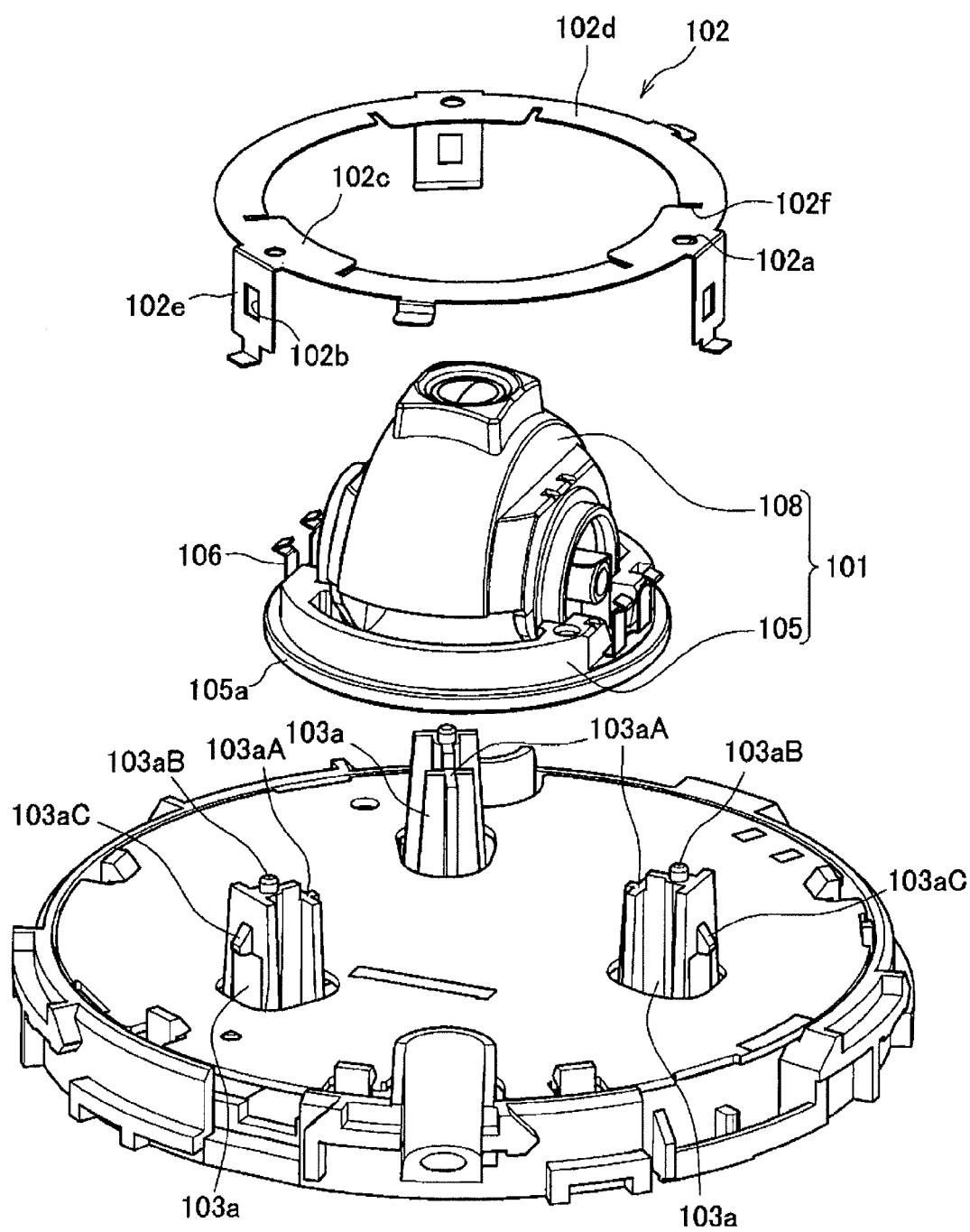
FIG. 7 is an exploded perspective view of the security camera according to the embodiment with exterior covers removed.

Referring to FIG. 7, the lens block 101 is composed of a base 105 and a lens case 108. A description is first given of the lens block 101.

Figure 8:
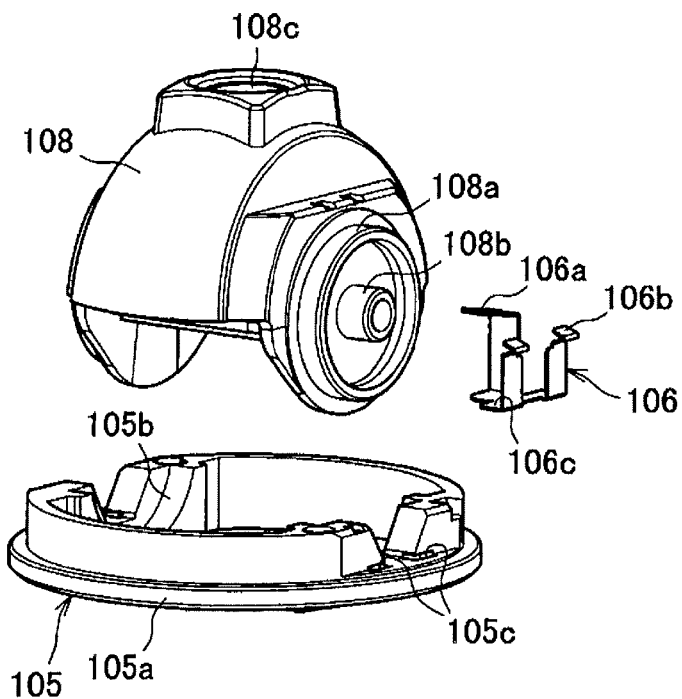
FIG. 8 is an exploded perspective view of a lens block.
Figure 9:
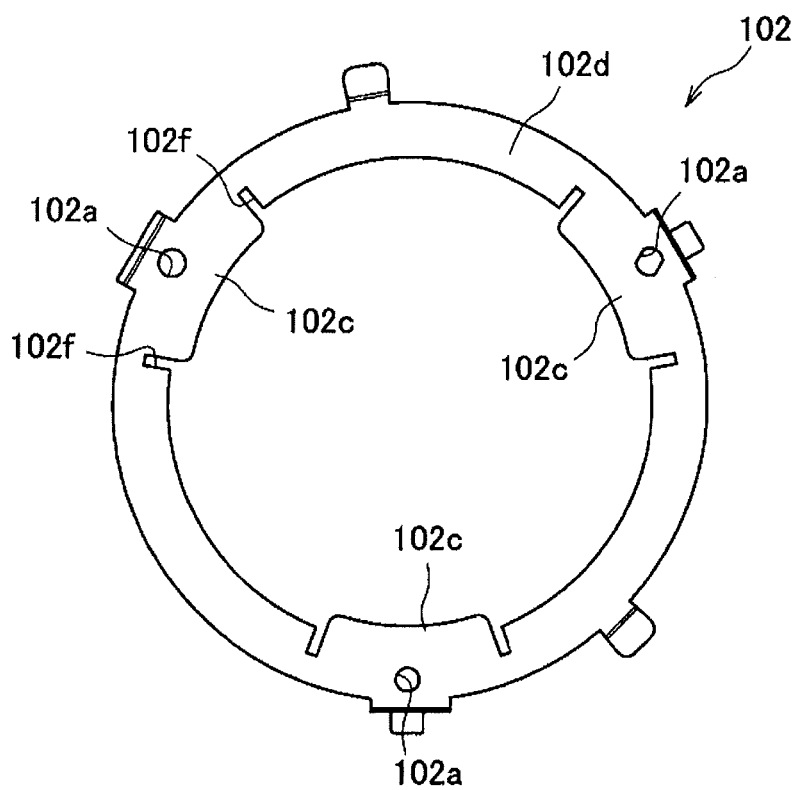
FIG. 9 is a plan view of a pan plate spring.
Figure 10:
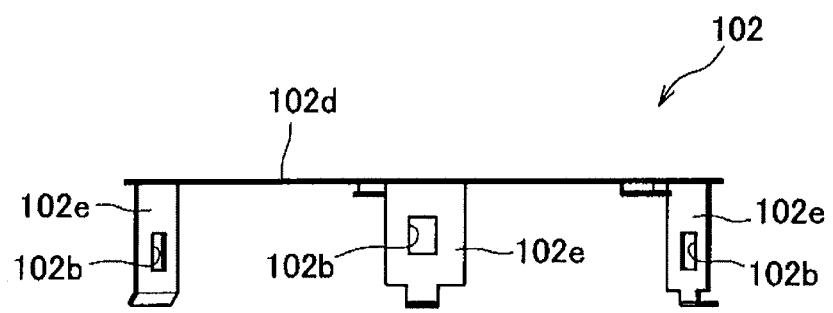
FIG. 10 is a lateral view of the pan plate spring.
Figure 11:
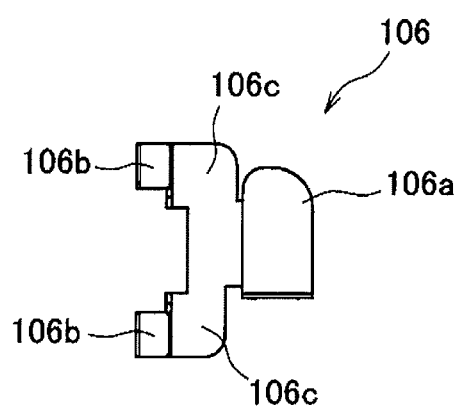
FIG. 11 is a plan view of a tilt plate spring.
Figure 12:
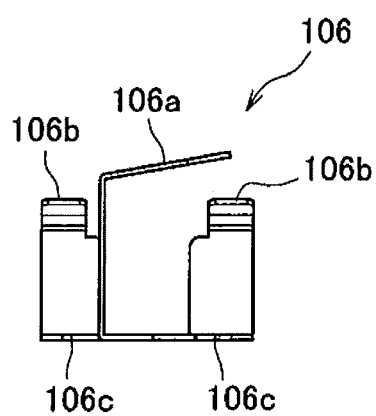
FIG. 12 is a lateral view of the tilt plate spring.
Figure 13:
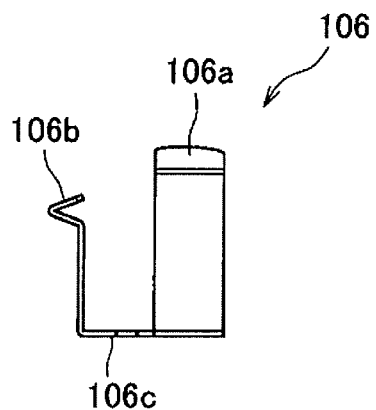
FIG. 13 is a lateral view of the tilt plate spring.

The base 105 is made of e.g. a synthetic resin. Referring to FIG. 8, lens case support portions 105b support the lens case 108 so as to be turnable in the tilt direction. The lens case support portion 105b has a circumferential surface, which corresponds to the circumferential surface of a slide portion 108a of the lens case 108. In this way, the lens case 108 can smoothly travel in the tilt direction. The base 105 is put on three projecting portions 103a and turned thereon in the pan direction. In addition, the base 105 supports the lens case 108 so as to be turnable in the pan direction. Further, the base 105 has an outer circumferential portion 105a formed in a circular cylindrical shape. The outer circumferential portion 105a is pressed against the lower case 103 side by a pan plate spring 102.

The lens case 108 is made of e.g. a synthetic resin. In addition, the lens 108c is installed on the lens case 108. A CCD (Charge Coupled Device) imaging element or a CMOS (Complementary Metal Oxide Semiconductor) imaging element or other electric parts are installed inside the lens case 108; however, illustration is omitted in the figures. The CCD imaging element or the CMOS imaging element is adapted to focus light passing through the lens 108c into an image and subject the image to photoelectric conversion to create signals. The lens case 108 is formed with projecting portions 108b on its lateral surfaces. The projecting portion 108b is an example of a columnar member and has a central axis coincident with the tilt-directional rotational axis of the lens case 108. The lens case 108 can be turned in the tilt direction on the base 105.

A tilt plate spring 106 is made of e.g. metal. The tilt plate spring 106 is secured to the base 105 and presses the circumferential surface of the projecting portion 108b of the lens case 108 toward the base 105 by elastic force. The tilt plate spring 106 secures the exterior cover 107 to the base 105 by the elastic force.

The tilt plate spring 106 includes bent portions 106a, 106b and an inserting portion 106c. The bent portion 106a is an example of a first bent portion and presses the circumferential surface of the projecting portion 108b toward the base 105 by the elastic force of the plate spring. The bent portion 106b is an example of a second bent portion. In addition, the bent portions 106b are inserted into corresponding securing holes 107a of the exterior cover 107 to secure the exterior cover 107 to the base 105 by the elastic force of the plate spring. The inserting portion 106c is formed like a plate. In addition, the inserting portion 106c is formed with an insertion side end portion on the bent portion 106a side and is inserted into an insertion hole 105c of the base 105. Consequently, the tilt plate spring 106 is secured to the base 105.

The pan plate spring 102 is made of e.g. metal. In addition, the plate spring 102 presses the base 105 toward the lower case 103 by elastic force. The pan plate spring 102 includes spring portions 102c, a circular portion 102d, and retaining portions 102e. The circular portion 102d is a thin plate and has a ring shape. The base 105 is inserted into the inner circumference of the circular portion 102d. Since the circular portion 102d is formed with cutout portions 102f at its inner circumference, the spring portion 102c has appropriate elastic force and presses the outer circumferential portion 105a of the base 105 by the elastic force. The retaining portion 102e is formed by being bent from the outer circumference of the circular portion 102d and retains the corresponding projecting portion 103a.

In the state where the security camera 100 is assembled, the lens block 101 is pressed by the pan plate spring 102 against the projecting portions 103a of the lower case 103 serving as a chassis of the security camera 100. The outer circumferential portion 105a of the base 105 of the lens block 101 is put on respective cutout portions 103aA of the projecting portions 103a formed on the lower case 103 to thereby position the base 105. Incidentally, the projecting portion 103a is provided with a column-shaped rib 103aB on its upper surface and with a square rib 103aC on its lateral surface.

The pan plate spring 102 is provided with positioning holes 102a and square holes 102b. The positioning holes 102a determine the position of the pan plate spring 102. The square holes 102b are adapted to secure the pan plate spring 102. Further, the spring portions 102c each having such a shape as to press the lens block 101 are each formed on the inside of the pan plate spring 102 by the corresponding cutout portions 102f.

Figure 14:
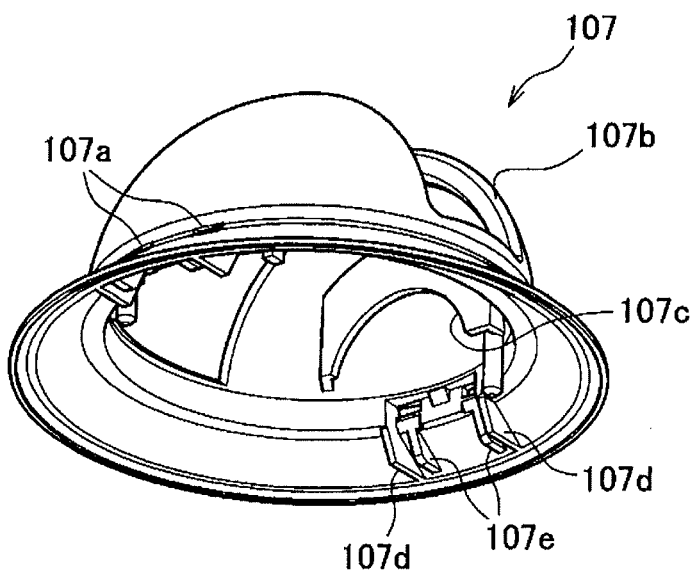
FIG. 14 is a perspective view of the exterior cover.
Figure 15:
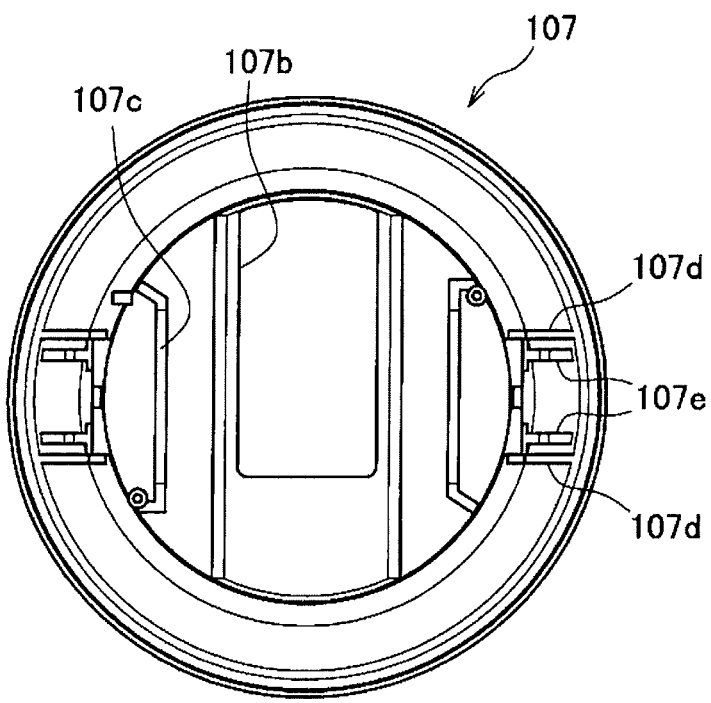
FIG. 15 is a bottom view of the exterior cover.
Figure 16:
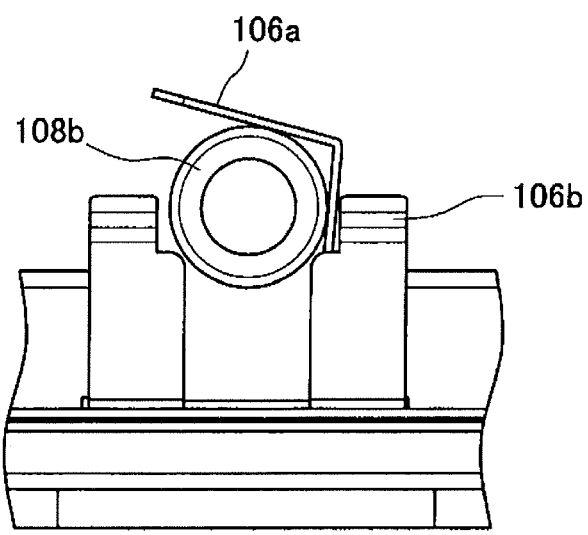
FIG. 16 is a partial enlarged view of FIG. 6, illustrating a state where the tilt plate spring holds a projecting portion of a lens case.

The exterior cover 107 covers the lens block 101. The exterior cover 107 is formed with a lens opening portion 107b. The lens opening portion 107b is opened in the exterior cover 107 in a tilt-directional shifting range of the lens 108c so that the lens 108c may be exposed. As shown in FIGS. 14 and 15, lens case support portions 107c are formed inside the exterior cover 107. The lens case support portion 107c has a circular surface, which corresponds to a circular surface of the slide portion 108a of the lens case 108. In this way, the lens case 108 can smoothly be shifted in the tilt direction.

Further, guide portions 107e and restricting portions 107d are provided inside the exterior cover 107. When the exterior cover 107 is secured to the base 105, the guide portions 107e come into contact with the corresponding bent portions 106b of the tilt plate spring 106. While coming into contact with the guide portions 107e, the bent portions 106b are guided to the corresponding securing holes 107a of the exterior cover 107. When the exterior cover 107 is secured to the base 105, the restricting portions 107d come into contact with corresponding lateral surfaces of the bent portions 106b of the tilt plate spring 106. The restricting portion 107d restricts the outward widening of the bent portion 106b. In this way, the guide portions 107e and the restricting portions 107d smoothly guide the bent portions 106b of the tilt plate spring 106 into the corresponding securing holes 107a of the exterior cover 107.

<2. Assembling Method in the Embodiment>

A description is next given of a method of assembling the security camera 100 in the present embodiment.

Figure 4:
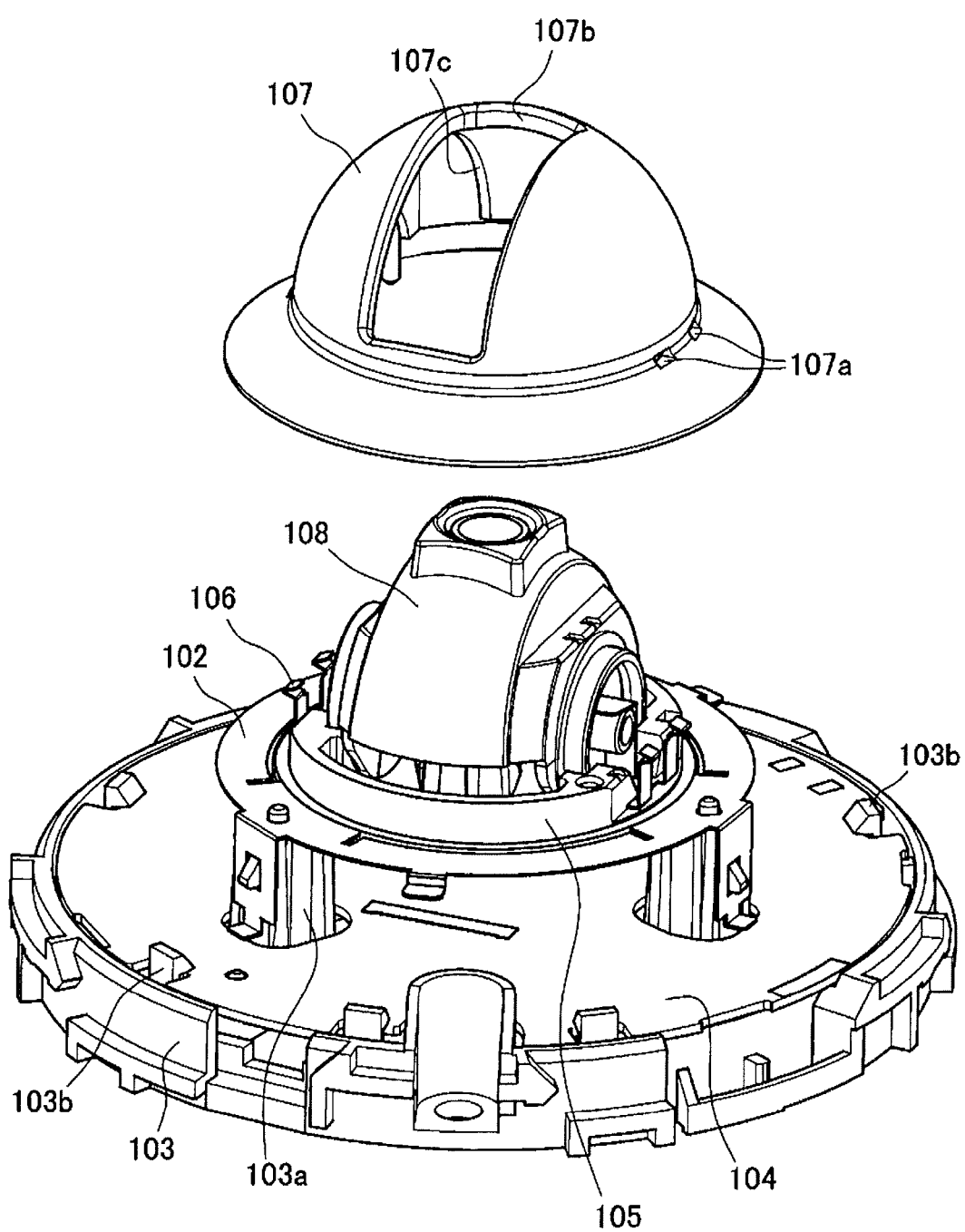
FIG. 4 is an exploded perspective view of the security camera shown in FIG. 3.
Figure 5:
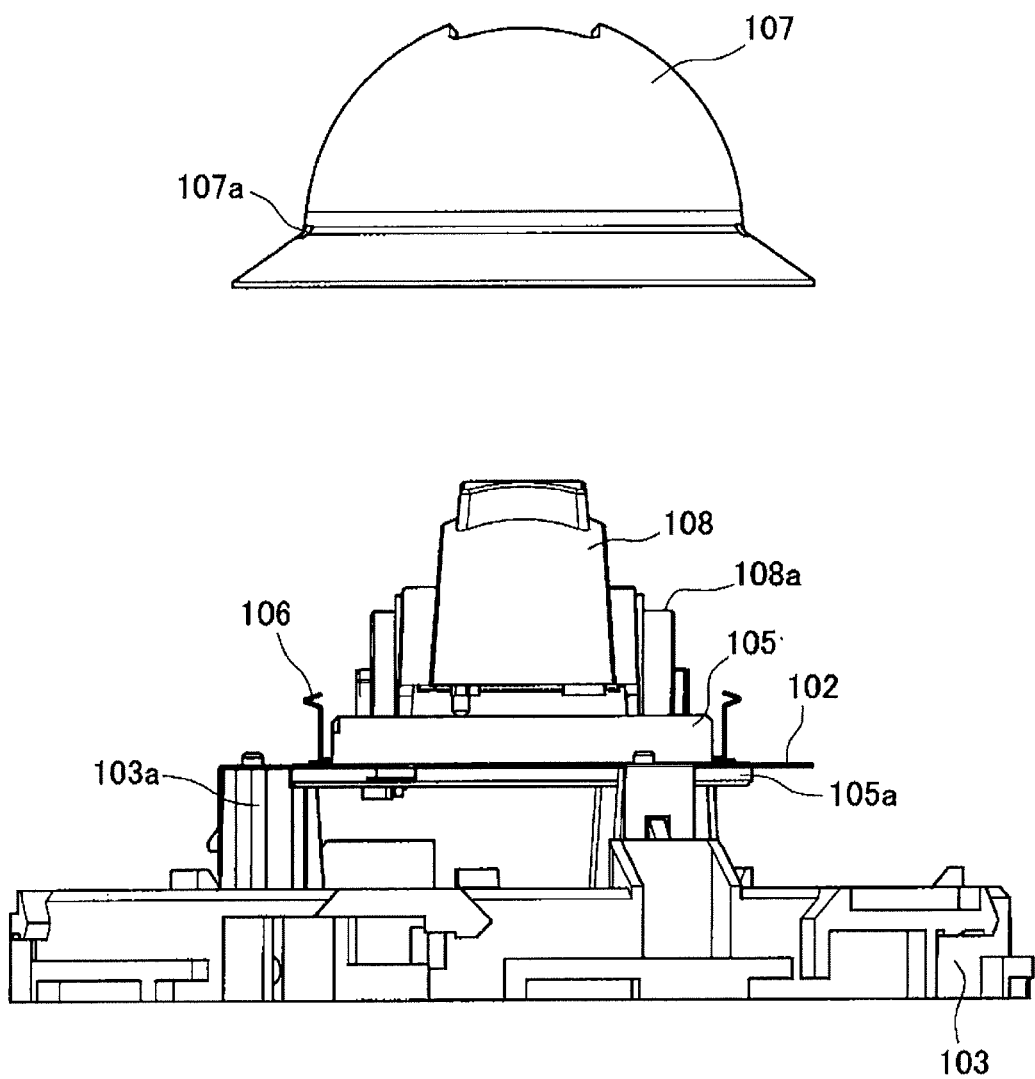
FIG. 5 is an exploded lateral view of the security camera shown in FIG. 3.
Figure 6:
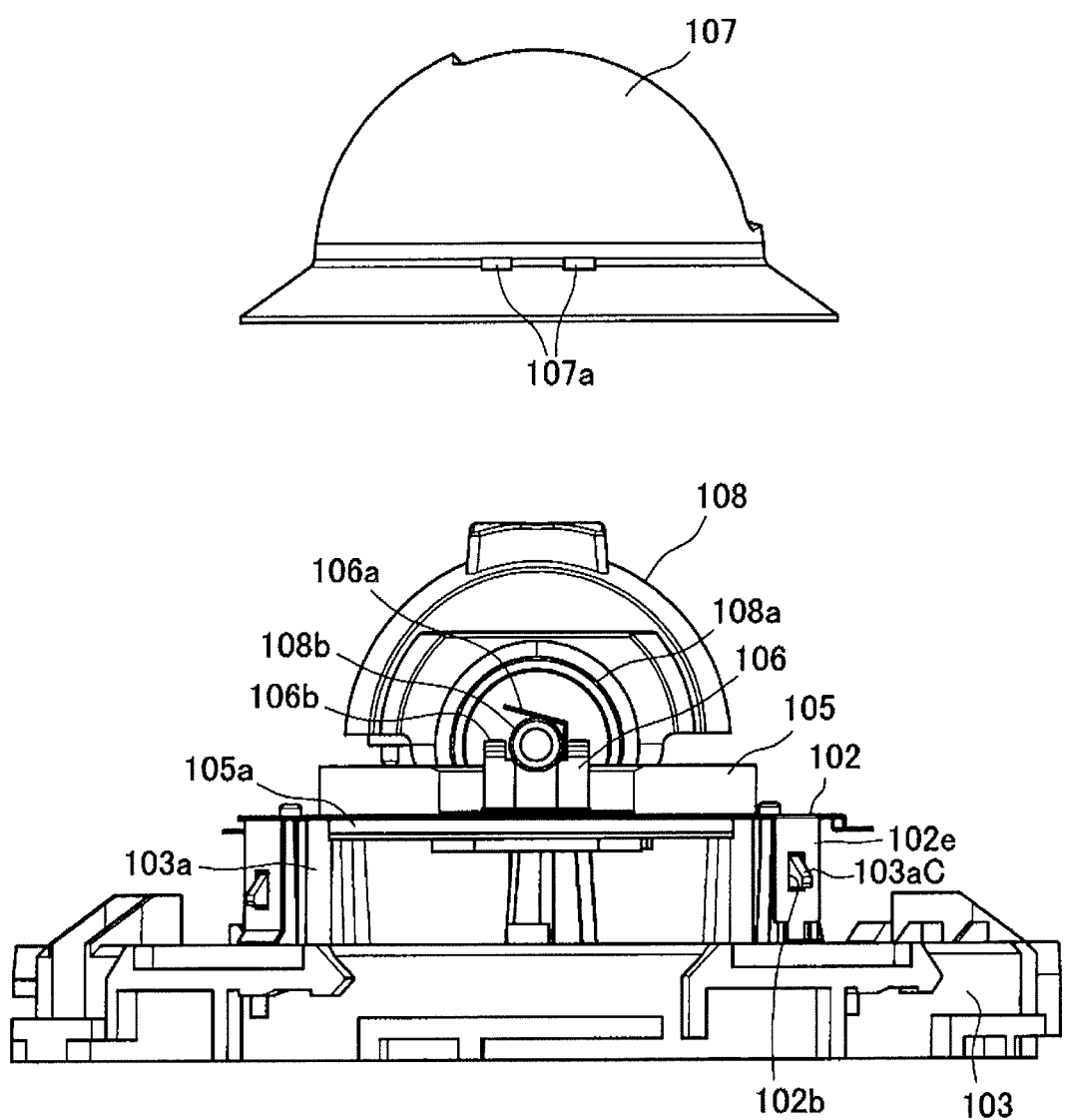
FIG. 6 is an exploded lateral view of the security camera shown in FIG. 3.

The circuit board 104 is installed on the lower case 103. The circuit board 104 is secured by a single screw not shown and the hooks 103b formed on the lower case 103 shown in FIG. 4.

The base 105 of the lens block 101 is put on the cutout portions 103aA formed on the projecting portions 103a of the lower case 103.

The pan plate spring 102 is next covered to hold the base 105. In addition, the positioning holes 102a are aligned with the corresponding column-shaped ribs 103aB shown in FIG. 7. Consequently, the position of the pan plate spring 102 is determined. Further, the pan plate spring 102 is pushed so that the square holes 102b are fitted to the corresponding ribs 103aC shown in FIG. 7. In this state, the pan plate spring 102 holds the base 105 by means of the three spring portions 102c formed inside the pan plate spring 102. The spring portion 102c has a function of a cantilever thin-plate spring. Thus, the base 105 is pressed against the cutout portions 103aA of the lower case 103 by means of the three spring portions 102c.

There are a plurality of the methods of increasing or decreasing the elastic force of the pan plate spring 102 in the embodiment. The methods have an advantage that it is easy to adjust the magnitude of the elastic force. Examples of the method of increasing or decreasing the elastic force include a method of increasing or decreasing the thickness of the pan plate spring 102, a method of increasing or decreasing the hardness of a material of the plate spring, a method of increasing or decreasing the size of the spring portion 102c, and a method of increasing or decreasing the thickness of the outer circumferential portion 105a of the base 105.

With the shape of the pan plate spring 102 in the present embodiment, the three retaining portions 102e provided at nearly regular intervals on the outer circumference of the circular portion 102d are fitted to the corresponding ribs 103aC of the lower case 103. Consequently, the elastic force of the spring portions 102c is applied to the square holes 102b of the three retaining portions 102e. Therefore, the square holes 102b are individually subjected to force in a direction where the pan plate spring 102 comes free from the lower case 103 by the elastic force caused by the spring portion 102c closed to the associated square hole 102b. However, such forces pull each other because the three retaining portions 102e are connected to each other via the circular portion 102d. Therefore, the pan plate spring 102 will not come free from the lower case 103. Thus, it is not necessary to secure the pan plate spring 102 to the lower case 103 by means of screws or the like.

Further, with the above-mentioned configuration and the shape of the pan plate spring 102, the mechanism for turning the lens block 101 in the pan direction (the arrow direction in FIG. 1) has only the base 105 having such a shape that the lens case 108 will not slide in the pan direction on the base 105, and the pan plate spring 102. Therefore, a complicated mechanism is not necessary unlike the traditional way and screws or the like are not necessary to secure the pan plate spring 102. Thus, the security camera 100 can achieve space saving.

The lens case 108 is put on the base 105. The lens case 108 is formed with the slide portions 108a on both the lateral surfaces. The slide portions 108a cause the lens case 108 to be turned in the tilt direction. The base 105 is formed with the lens case support portions 105b shaped to receive the corresponding slide portions 108a.

The tilt plate spring 106 is next inserted into the insertion holes 105c of the base 105 shown in FIG. 8 in the state where the bent portion 106a holds the projecting portion 108b of the lens case 108. Incidentally, the tilt plate spring 106 is similarly inserted into the base 105 also on the opposite surface side not shown in FIG. 8.

In this state, the lens case 108 and the base 105 are united with each other via the tilt plate spring 106. Since the bent portion 106a holds the projecting portion 108b of the lens case 108, a thin-plate portion supporting the bent portion 106a serves as a cantilever thin-plate spring. The elastic force of the thin-plate spring serves as a load when the lens case 108 is turned based on the slide portion 108a. As a result, the elastic force of the tilt plate spring 106 serves as force adapted to hold the lens 108c at a position in the tilt direction.

Incidentally, if the slide portion 108a and the projecting portion 108b are formed separately from each other, there is an advantage as below. The contact with the tilt plate spring 106 may damage the projecting portion 108b of the lens case 108. Even in such a case, the slide surface in the tilt direction is the surface of the slide portion 108a different from the projecting portion 108b coming into contact with the tilt plate spring 106. Therefore, the movement in the tilt direction can be maintained. The slide portion 108a having a greater diameter can stabilize the movement in the slide direction. The projecting portion 108b having a smaller diameter can downsize the tilt plate spring 106.

There are a plurality of the method of increasing or decreasing the elastic force of the tilt plate spring 106 in the present embodiment. The method has an advantage that it is easy to adjust the magnitude of the elastic force. Examples of the methods of increasing or decreasing the elastic force include a method of increasing or decreasing the thickness of the tilt plate spring 106, a method of increasing or decreasing the hardness of a material of the plate spring, a method of increasing or decreasing an bending angle of the bent portion 106a, and a method of increasing or decreasing the diameter of the projecting portion 108b of the lens case 108.

The tilt plate spring 106 is inserted in a direction perpendicular to the vertical direction encountered during installation. The tilt plate spring 106 presses the lens case 108 toward the base 105 side. Therefore, the tilt plate spring 106 will not come off in the vertical direction encountered during the installation. On the other hand, the tilt plate spring 106 can easily be removed in the inserting direction.

Also another bent portion 106b of the tilt plate spring 106 is such that a thin-plate portion supporting the bent portion 106b serves as a plate spring. The bent portion 106b is inserted into the securing hole 107a of the exterior cover 107. In this way, the exterior cover 107 is united with the base 105. Also the insertion direction of the tilt plate spring 106 into the securing hole 107a is a direction perpendicular to the vertical direction encountered during the installation.

With the configuration described above, the tilt plate spring 106 is secured by being held between the base 105 and he exterior cover 107. Thus, it is not necessary to secure the tilt plate spring 106 by means of a screw or the like.

As above, the security camera 100 can be easily assembled only by overlapping the lower case 103, the circuit board 104, the lens block 101, and the pan plate spring 102 in order.

<3. Adjusting Method in the Embodiment>

A description is given of a method of adjusting the lens 108c of the security camera 100 in the present embodiment.

[Pan Direction]

If the lens block 101 is to be manually turned in the pan direction indicated with arrows in FIG. 1, the spring portion 102c of the pan plate spring 102 serves as a load. If the lens block 101 is turned by a force equal to or greater than the load and one's hand is released from the lens block 101 when the lens 108c faces a desired direction, the lens 108c is stopped at the position. The holding force of the lens block 101 in this state corresponds to the elastic force of the spring portion 102c of the pan plate spring 102.

The elastic force is increased or decreased by the plurality of methods as described above, which are simple. In the embodiment, the elastic force is studied as the rotational moment of the lens block 101 and set at 50 to 100 Nmm. This value is determined depending on the weight, size and the like of the lens block 101. Therefore, the fact that there is a plurality of the methods of increasing or decreasing the elastic force is very effective for commercialization of products.

[Tilt Direction]

If the lens block 101 is to be manually turned in the tilt direction indicated with arrows in FIG. 2, the elastic force of the bent portion 106a of the tilt plate spring 106 serves as a load. If the lens block 101 is turned by a force equal to or greater than the load and one's hand is released from the lens block 101 when the lens 108c faces a desired direction, the lens 108c is stopped at the position. The force for holding the lens block 101 in this state corresponds to the elastic force of the bent portion 106a of the tilt plate spring 106.

The elastic force is increased or decreased by the plurality of methods as described above, which are simple. In the embodiment, the elastic force is studied as the rotational moment of the lens block 101 and set at 10 to 40 Nmm. This value is determined depending on the weight, size and the like of the lens block 101. Therefore, the fact that there is a plurality of the methods of increasing or decreasing the elastic force is very effective for commercialization of products.

According to the embodiment described above, the security camera 100 is such that the mechanism for shifting the lens 108c in the tilt and pan directions does not have large component parts and can be realized by a small number of component parts compared with traditional security cameras. In addition, the security camera 100 does not need a fastening screw and is assembled only by overlapping the component parts from one direction and more easily than before. As a result, the present embodiment can realize the security camera reduced in cost and in size.

The present disclosure contains subject matter related to that disclosed in Japanese Priority Patent Application JP 2010-241255 filed in the Japan Patent Office on Oct. 27, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. An imaging device comprising:
    a lens case on which a lens is installed;
    a columnar member having a central axis coincidental with a rotational axis of the lens case, the rotational axis extending in a tilt direction being an in-plane direction perpendicular to a horizontal direction;
    a base including the columnar member, the base supporting the lens case so that the lens case is turnable in the tilt direction;
    a support member including plural projections for rotatably supporting the base so that the base is rotatable in the horizontal direction; and
    a press part secured to the support member and pressing a circumferential surface of the columnar member toward the support member by elastic force to restrain the base from movement in a vertical direction.

2. The imaging device according to claim 1, wherein the press part has a first bent portion pressing the circumferential surface of the columnar member toward the support member.

3. The imaging device according to claim 1, further comprising: a tilt plate spring having a plate-like insertion portion and a bent portion in contact with and exerting a pressing force on the lens case, and
    the base has a first opening adapted to receive the insertion portion inserted thereinto to secure the press part.

4. The imaging device according to claim 3, further comprising:
    a cover allowing the lens to be exposed and covering the lens case, the columnar member, the base and the press part;
    wherein the tilt plate spring secures the cover to the base by elastic force.

5. The imaging device according to claim 4, wherein the cover supports the lens case turnably in the tilt direction.

6. The imaging device according to claim 4, wherein the tilt plate spring has a second bent portion securing the cover to the base.

7. The imaging device according to claim 4, wherein the cover has a second opening adapted to receive the tilt plate spring inserted thereinto and a guide portion guiding the tilt plate spring to the second opening.

8. An imaging device comprising:
    a plate spring of a shape that includes an arc, comprising:
    a first plate portion of a shape that includes an arc; and
    a spring portion located at an inner position of the first plate portion and operable to press a first surface of a column-shaped base towards a support member supporting a lens block, the column-shaped base including a second surface opposite the first surface and a circumferential surface,
    wherein the column-shaped base supports a lens case on which a lens is installed, the lens case being supported on the column-shaped base for tilt rotation, the base being rotatable in a pan direction, and the second surface of the base being supported for rotation in the pan direction on plural projecting portions projecting from the support member.

9. The imaging device according to claim 8, wherein the first plate spring further comprises a retaining portion bent from the column-shaped base to retain the projecting portions.

10. The imaging device according to claim 8, wherein the first plate spring includes a circular portion formed with opening portions for receiving projections extending from the projecting portions, thereby restricting a position of the first plate spring with respect to the support member.

* * * * *